United States Patent [19]

Bonser

[11] 4,331,169
[45] May 25, 1982

[54] AWNING AND METHOD OF MAKING SAME
[75] Inventor: John R. Bonser, Parkersburg, W. Va.
[73] Assignee: The B. F. Goodrich Company, Akron, Ohio
[21] Appl. No.: 152,443
[22] Filed: May 22, 1980
[51] Int. Cl.³ .......................................... E04F 10/06
[52] U.S. Cl. .................................. 135/5 AT; 160/67; 156/244.11
[58] Field of Search .............. 135/5 AT, 1 A; 160/66, 160/67, 68; 428/246; 156/244.11

[56] References Cited
U.S. PATENT DOCUMENTS
3,279,986 10/1966 Hyman .............................. 428/246
4,180,117 12/1979 Greer ................................... 160/67

Primary Examiner—Reinaldo P. Machado
Attorney, Agent, or Firm—James R. Lindsay

[57] ABSTRACT

An awning particularly suited for use with recreational vehicles is constructed with a main awning portion made of a conventional awning material and a terminal portion which serves as a cover for the main awning portion when the awning is rolled on a wind-up core for storage. The terminal cover portion is a trilaminate consisting of two layers of flexible thermoplastic material with a dimensionally stable scrim layer interposed between the two thermoplastic layers.

4 Claims, 4 Drawing Figures

AWNING AND METHOD OF MAKING SAME

TECHNICAL FIELD

The present invention relates generally to awnings, and more particularly to the type of awning that includes a cover component that constitutes a portion of the actual awning itself and which will cover the remainder of the awning when the awning is rolled upon itself when not being used. Specifically, the present invention is directed to an awning that is particularly suited for use as vehicular awnings for house trailers, motor homes and other recreational vehicles. The cover portion of the awning is located between the main portion of the awning and the vehicle to which the awning is secured so that, when the awning is rolled for storage adjacent the vehicle, the cover portion will constitute at least the outermost full wrap over the rolled awning to protect the main portion of the awning from the elements when the awning is not in use.

BACKGROUND ART

Awnings constitute an accessory available for use with most mobile homes, house trailers, campers or other recreational vehicles, often designated as RVs. The awnings are retractable so that they can be stored on the outer surface of the recreational vehicle when not in use. To protect the awning while it is being stored, a cover portion of one type or another is used. Generally, the awning is rolled onto a spring-wound, storing core, much like a "roll-up" window shade. The core onto which the awning is wound customarily is located at the outboard end of the awning and winds toward the recreational vehicle to which it is attached until the entire awning is wound onto the core in juxtaposition with the side of the recreational vehicle. As such, that portion of the awning that constitutes the last layers or layers of the awning to be wound onto the core serve as a cover for the remainder of the awning when so stored.

It has heretofore been attempted to employ a plastic sheet as the inboard terminal section of the awning so that as the inboard terminal sections wind onto the storing core it serves to cover and protect the remainder of the awning. Such prior cover portion when made of flexible polyvinyl chloride plastic or the like and when subjected to higher temperatures such as those present with direct sun, have a tendency to shorten, or buckle, in the longitudinal direction of the awning—i.e., parallel to the longitudinal axis of the vehicle to which it is secured. This longitudinal shrinkage, or buckling, also occasions lateral elongation of the cover.

SUMMARY OF THE INVENTION

The present invention overcomes the problems of dimensional instability through the use of an inboard terminal cover portion of laminate structure and provides a process by which the laminate cover portion is fabricated. Construction of the awning cover portion of the present invention begins with the lamination of a flexible plastic film, such as flexible plasticized polyvinyl chloride, onto a flexible scrim material with limited heat deformation properties. The scrim is preferably a mesh or basket woven fabric having approximately 5½ squares per square centimeter. The resultng bilaminate is heated, as by radiant heat and thereafter by a first roll in a sheet roll stack. Between the heated roll and an embossing roll, a third layer of a flexible plastic material such as plasticized polyvinyl chloride, is added to the bilaminate through an extrusion process. The resulting trilaminate is cooled after leaving the embossing roll. The trilaminate can be cut to suitable lengths for different awnings and attached by any suitable means, such as by stitching or heat sealing, to the remaining portion of the awning. The awning cover portion is, in turn, attached to the recreational vehicle. By controlling the draw-down and cooling rate of the extrusion, dimensional changes in the longitudinal direction of the cover may be considerably reduced. The scrim layer prevents the heretofore experienced dimensional change in the transverse direction of the awning cover. Thus, the combination of a trilaminate material and processing technique by which it is fabricated provide a dimensionally stable awning cover.

One preferred embodiment is shown by way of example in the accompanying drawings and described in detail without attempting to show all of the various forms and modifications in which the invention might be embodied.

DETAILED DESCRIPTION OF THE INVENTION

Figure 1:
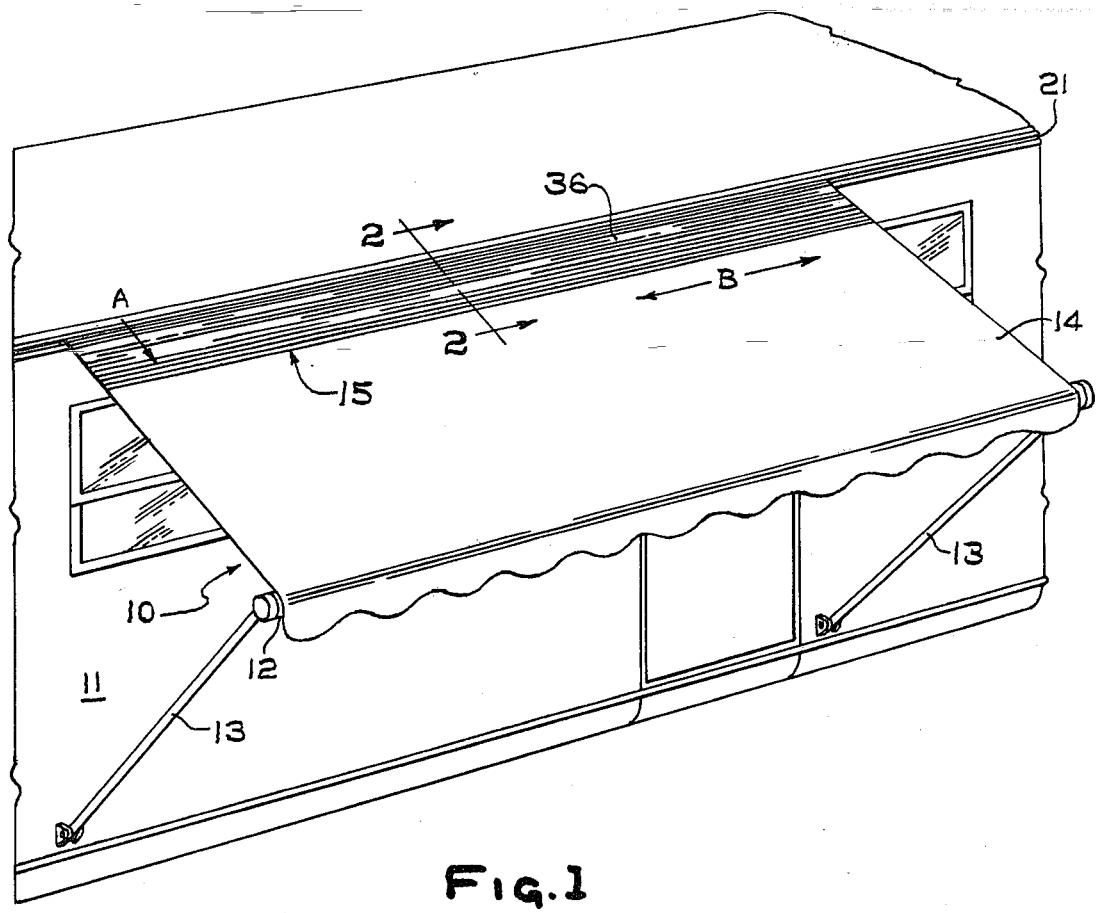
FIG. 1 is a perspective view of an awning embodying the present invention attached to the side of a recreational vehicle.

Referring to FIG. 1, a recreational vehicle awning 10 is attached along its inboard end to recreational vehicle 11 and along its outboard end to a wind-up core 12 attached to recreational vehicle 11 by struts 13,13.

Awning 10 is composed of a main awning portion 14 and a cover portion 15 which serves as a protective covering for the main awning portion 14 when the awning is wound on core 12 while not being used. The improved awning cover portion 15 is comprised of three layers, a first layer 16 of a flexible thermoplastic material, a second layer 17 of a flexible thermoplastic material bonded to layer 16, and an intermediate scrim layer 18 disposed between layers 16 and 17. Although layers 16 and 17 can be bonded together (with scrim layer 18 interposed therebetween) by a suitable bonding adhesive system, preferably layer 16 and layer 17 are formed of thermoplastic materials that can be bonded together using merely heat and pressure. For example, layers 16 and 17 can be formed of plasticized vinyl chloride polymer (such as polyvinyl chloride). Layers 16 and 17 desirably each are about 0.05 centimeters thick.

Scrim layer 18 may be any open mesh scrim material that has "insignificant" stretch and contraction over a temperature change from 0° C. to 70° C. A scrim fabric which does not change dimensionally more than 5 percent, preferably 3 percent, either in width or in length when heated from 0° C. to 70° C. would be suitable for use in the cover portion 15 of awning 10. Examples of scrim material which could be used for scrim layer 18 are open-mesh polyester fiber scrim fabric, open-mesh glass fiber scrim fabric, open-mesh Kevlar aromatic polyamide fiber scrim fabric and open-mesh rayon fiber scrim fabrics. Scrim layer 18 desirably has about 5½ apertures per square centimeter, is of a standard basket-weave pattern, and is approximately 0.05 centimeters in thickness.

Figure 2:
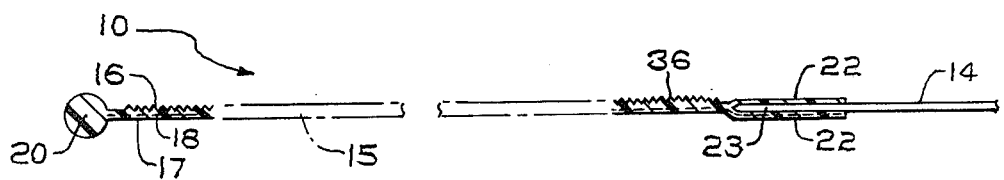
FIG. 2 is a partial section on line 2—2 of FIG. 1.

As shown in FIG. 2, cover portion 15 of awning 10 desirably terminates along its inboard edge (that extends adjacent to the recreational vehicle 11) in a cylindrical-shaped retaining bead 20 which interengages a "C-shaped" retaining channel 21 that extends longitudinally along the upper region of the recreational vehicle to secure the inboard end of awning 10 to the recreational vehicle 11. The outboard edge of awning cover portion 15 desirably terminates in a bifurcated, or V-shaped, selvage 22. The inboard edge 23 of the main awning portion 14 of awning 10 is inserted between the opposed flanges of the bifurcated selvage 22 and is secured therebetween by stitching the three layers together or by bonding the opposed flanges of the bifurcated selvage 22 to the inboard edge 23 of the main awning portion 14 with a bonding adhesive system or by heat sealing the flanges to awning portion 14. While the dimension of awning cover 15 measured between bead 20 and the bifurcated selvage 22 will vary depending upon the size of the particular awning, the normal dimension is approximately 40 centimeters.

The main awning portion 14 may be made of any suitable awning material but, desirably, is made of a conventional canvas cloth awning material which may be coated with a waterproofing material to provide optimum protection against leakage.

Figure 3:
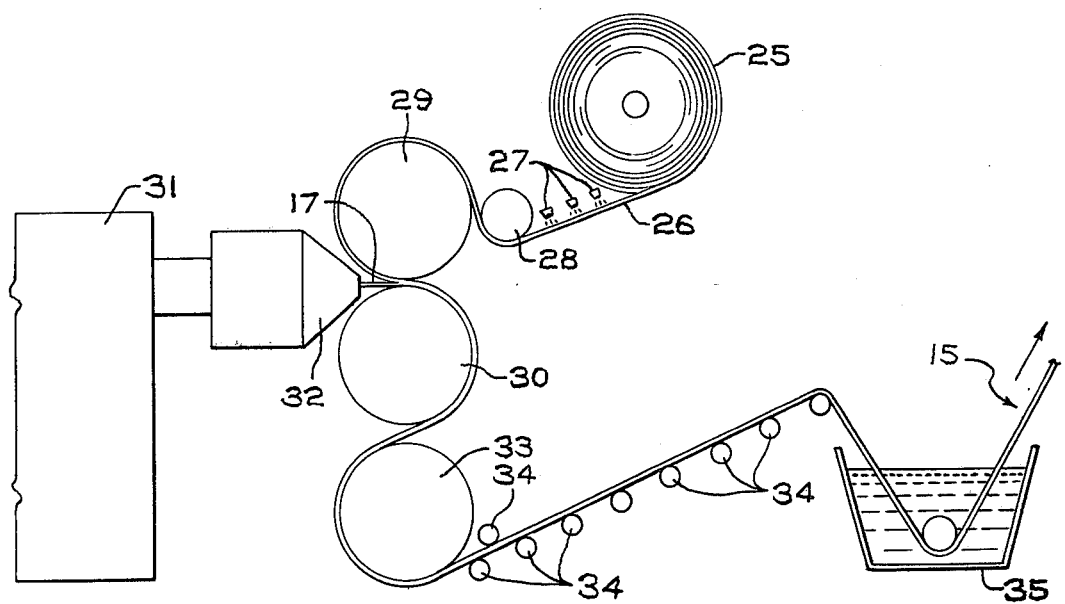
FIG. 3 is a schematic elevation view illustrating a portion of the process of the present invention for manufacturing the cover portion of the awning shown in FIG. 1.

The layer 16 and scrim layer 18 are preferably formed in a conventional, but independent, laminating operation and are placed on a supply roll, or reel, 25, as represented in FIG. 3. The scrim layer 18 and film layer 16 form a bilaminate material 26 which passes from the supply roll 25 past a plurality of radiant heaters 27,27. The bilaminate material 26 then passes around an idler roll 28 and over a heated roll 29.

The diameter of the heated roll 29 must be appropriate to provide the surface contact necessary to preheat the bilaminate 26 to the desired temperature when considering not only the rate at which the bilaminate travels but also the temperature of the heated roll 29.

The bilaminate 26 leaves the heating roll 29 and is passed around the outer surface of the embossing roll 30. Medially of the heating roll 29 and embossing roll 30, however, layer 17 is added to the bilaminate 26 from an extruder 31 through an extruder die 32. Thus, as the awning cover portion 15 passes between the embossing roll 30 and the heating roll 29 it becomes a trilaminate material. The trilaminate passes over a cooling roll 33 and over a plurality of idler rollers 34,34 from which it is directed into a cooling tank 35. After passing through the cooling tank 35 the trilaminate is then wound on a storage roll, not shown.

The rolls 29, 30 and 33 are commonly referred to as a sheet roll stack and while the dimensions of the rolls may vary, as discussed above in conjunction with the heating roll 29, 25 centimeter diameter rolls have been found convenient for the application of the present process. It is also to be noted that the cooling roll 33 is not an absolutely essential element.

Figure 4:
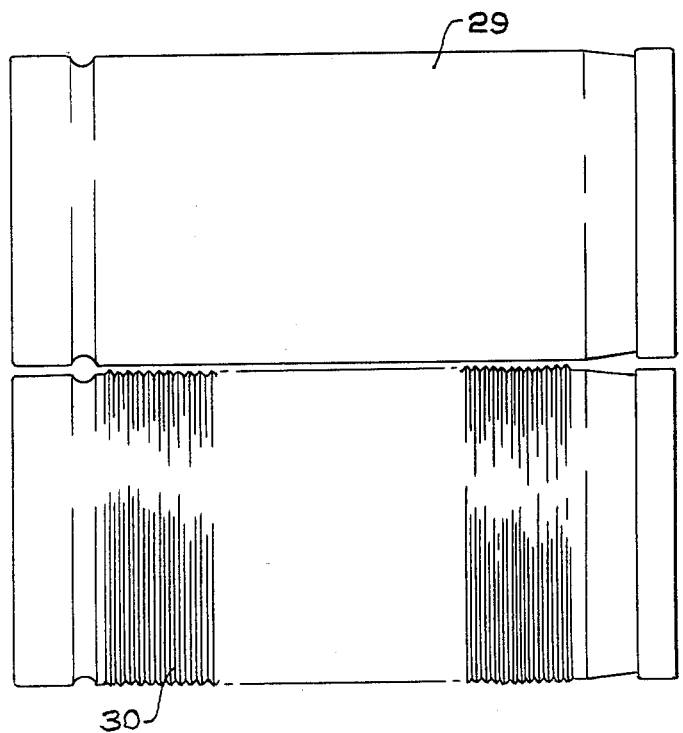
FIG. 4 is a front elevation view of two of the cooperating opposed rolls utilized in the process illustrated in FIG. 3.

The cooperative profiles of the heated roll 29 and embossing roll 30 are best shown in FIG. 4. As can be seen, the rolls 29 and 30 cooperate so as not to destroy the cylindrical-shaped bead 20 and bifurcated selvage 22 formed into the plastic material of layer 17 as it is extruded. The opposed apertures and recesses in rolls 29 and 30 cooperate with the extruder die 32 in a well-known manner to maintain the cylindrical-shaped bead 20 and the V-shaped selvage 22 along the edges of the finished awning cover portion 15. The embossing roll 30 may have a pattern formed thereon. This pattern may be selected to provide a desired texture 36 to the finished awning cover portion 15.

By preheating the bilaminate before the extrudate is applied, the differential cooling of the extrudate onto a prefabricated base is minimized, thus reducing "memory" stresses and imparting more favorable dimensional stability, particularly in the direction of arrow B in FIG. 1. This is the longitudinal axis of the complete awning.

The scrim layer 18 provides the trilaminate assembly with good dimensional stability in the direction of arrow A, as also seen in FIG. 1. The direction of arrow A is in the transverse direction of the finished awning. The scrim layer 18 as a result of being interposed and bonded between the upper and lower layers 16 and 17 of the trilaminate and by having significant tensile strength in the direction of arrow A, prevents the trilaminate from elongating in this direction.

While the invention has been described with reference to a specific embodiment, it will be understood that there are many variations which would come within the spirit and scope of the invention as defined in the appended claims.

I claim:

1. An awning particularly suited for use with recreational vehicles which comprises a main awning portion having an inboard edge portion and a cover portion attached to said main awning portion along the inboard edge of said main awning portion which serves as a cover for said main awning portion when said main awning portion is rolled upon itself for storage, said cover portion being comprised of two layers of flexible thermoplastic material and a scrim fabric layer interposed between said two layers of flexible thermoplastic material, said scrim layer having no more than five percent dimensional change in width or length when heated from 0° C. to 70° C., said two layers of flexible thermoplastic material being bonded together with said scrim layer disposed therebetween to form a trilaminate structure, said cover portion having flanges which form a bifurcated outboard edge, the said inboard edge of said main awning portion being secured between said flanges of said cover portion.

2. The awning of claim 1 wherein said cover portion has an inboard terminal edge which serves as a retaining means for securing the cover-portion of said awning to a support wall.

3. The awning of claim 2 wherein said inboard terminal edge is a cylindrical-shaped bead.

4. An awning cover member comprising a trilaminate having a pair of flexible thermoplastic film layers and a scrim layer interposed between said pair of flexible thermoplastic film layers, the inboard terminal edge of said awning cover being a cylindrical-shaped bead extending along the extent of said inboard edge and adapted to fit into a C-shaped retaining groove, the outboard terminal edge of said awning cover being bifurcated.

* * * * *